United States Patent
Gray

(10) Patent No.: US 7,588,411 B2
(45) Date of Patent: Sep. 15, 2009

(54) WORKING MACHINE

(75) Inventor: Gordon Gray, Stoke on Trent (GB)

(73) Assignee: JCB Compact Products Limited, Uttoxeter (GB)

( * ) Notice: Subject to any disclaimer, the term of this patent is extended or adjusted under 35 U.S.C. 154(b) by 204 days.

(21) Appl. No.: 11/613,570

(22) Filed: Dec. 20, 2006

(65) Prior Publication Data

US 2007/0137912 A1 Jun. 21, 2007

(30) Foreign Application Priority Data

Dec. 21, 2005 (GB) ................................. 0525911.4

(51) Int. Cl.
*B62D 21/00* (2006.01)
(52) U.S. Cl. ...................................... 414/685; 180/312
(58) Field of Classification Search ................. 414/680, 414/685, 686; 180/311, 312
See application file for complete search history.

(56) References Cited

U.S. PATENT DOCUMENTS

| 5,112,183 | A |   | 5/1992 | Nusbaum et al. |         |
|-----------|---|---|--------|----------------|---------|
| 5,964,567 | A | * | 10/1999| Bamford        | 414/685 |
| 6,152,253 | A | * | 11/2000| Monaghan       | 180/291 |
| 6,796,762 | B2| * | 9/2004 | Vicars et al.  | 414/685 |
| 6,923,282 | B2| * | 8/2005 | Chernoff et al.| 180/65.3|
| 7,207,600 | B2| * | 4/2007 | Beckmann et al.| 280/781 |
| 2007/0071587 | A1 | * | 3/2007 | Baumann et al. | 414/680 |

FOREIGN PATENT DOCUMENTS

| DE | 940 457      | 3/1956  |
| DE | 4335860 A1   | 10/1993 |
| DE | 4411955 A1   | 4/1994  |
| EP | 1 712 115    | 10/2006 |
| FR | 2823174 A1   | 4/2001  |
| GB | 938945 A     | 10/1963 |
| GB | 1334682      | 10/1973 |

* cited by examiner

*Primary Examiner*—Donald Underwood
(74) *Attorney, Agent, or Firm*—Greenlee Winner and Sullivan PC

(57) ABSTRACT

A working machine includes a working arm, the arm in use, carrying a working implement, the arm being raisable and lowerable about a generally horizontal axis by a power operated device, a cab structure for an operator, an engine for providing power to a ground engaging drive structure to drive the machine over the ground and for operating the working arm, each of the working arm, the cab structure and the engine being mounted on a machine chassis, and the machine being characterized in that the chassis includes a single primary chassis member which provides a substantial resistance to torsional deformation of the machine between the front and rear ends of the machine, the single primary chassis member including a first part which extends longitudinally of the machine at the one side of the machine, and a second part which extends transversely of the first part at or towards one end of the machine.

18 Claims, 3 Drawing Sheets

WORKING MACHINE

CROSS-REFERENCE TO RELATED APPLICATIONS

This application claims priority under 35 USC 119 (a)-(d) to United Kingdom Patent Application No. 0525911.4 filed on Dec. 21, 2005, which is incorporated by reference in its entirety herein.

BACKGROUND OF THE INVENTION

This invention relates to a working machine of the kind including a chassis, a ground engaging propulsion structure, and a working arm. Such machines are used to perform for loading and/or excavating operations, in the former case the working arm being a loader arm and in the latter case there being also a working arm being an excavating arm, or a single excavating working arm.

The chassis of such working machines typically includes a pair of chassis members which extend substantially longitudinally of the machine and the chassis members being interconnected by cross members, the longitudinally extending chassis members and the cross members together providing the main structural support for components such as axles carrying wheels, the working arm, an engine and a cab structure, and provide resistance to torsional deformation of the machine between the front and rear ends. It will be appreciated that the components themselves may add rigidity to the machine and may make some contribution to torsional stiffness.

Machines are also known in which a chassis is provided by a single central longitudinal extending chassis spine, with a cab mounted on one side of the spine and the engine on the other side of the spine.

More particularly but not exclusively the invention has been devised for a working machine for performing loading operations. It is desirable for some applications, for such a working machine to have a minimal height, for example so that the machine may work within a standard container space, within a silo or otherwise where height is particularly restricted. However it is also desirable for there to be a minimum clearance between the chassis and the ground to enable the working machine to be driven over rough ground. These two requirements compete and ordinarily, any working machine design has to be a compromise between these requirements.

SUMMARY OF THE INVENTION

According to a first aspect of the invention we provide a working machine which includes a working arm, the arm in use, carrying a working implement, the arm being raisable and lowerable about a generally horizontal axis by a power operated device, a cab structure for an operator, an engine for providing power to a ground engaging drive structure to drive the machine over the ground and for operating the working arm, each of the working arm, the cab structure and the engine being mounted on a machine chassis, and the machine being characterised in that the chassis includes a single primary chassis member which provides a substantial resistance to torsional deformation of the machine between the front and rear ends of the machine, the single primary chassis member including a first part which extends longitudinally of the machine at the one side of the machine, and a second part which extends transversely of the first part at or towards one end of the machine.

In accordance with the invention, a machine may be produced which is both of low height and which provides a desired clearance between the chassis and the ground. This is because there is a single primary chassis member only at one side of the machine, so that the cab structure, which is the major contributor to machine height requirements, may be positioned beside the first part of the single primary chassis member and behind or in front of the second part of the single primary chassis member. Thus there is no need for any chassis member which provides any substantial torsional stiffness to extend beneath the cab structure, although the cab structure may have some frame part for support if desired.

Although the invention may be applied to various working machines, the working machine may be for performing loading operations in which case the working arm may be a loader arm carrying a working implement such as a loading forks, for lifting and loading a load. The loader arm may be mounted on the chassis so as to extend forwardly of the machine generally above the first part of the single primary chassis member. For example a mounting structure for the loader arm may be positioned at or towards a rear end of the first part of the single primary chassis member.

The engine may be mounted on a sub-frame which in use is secured to the single primary chassis member, e.g. by fasteners. Although the sub-frame may be secured to the second part of the single primary chassis member, where the second part of the single primary chassis member is provided at or towards a front end of the machine, desirably the sub-frame is secured to a third chassis part which extends transversely of the first part of the single primary chassis member, the third chassis part being located at or towards a rear end of the machine. Thus the sub-frame may be secured to the single primary chassis member so as to extend beside the first part of the single primary chassis member and forwardly of the third part of the single primary chassis member.

The sub-frame may carry an axle beneath, to which drive may be transmitted via a transmission, from the engine, and the axle may carry a pair of ground engaging wheels which may thus be driven to drive the machine over the ground. The transmission may be hydrostatic, there being at least one hydraulically driven transmission motor to drive the wheels, the motor being mounted on the sub-frame.

The working arm may be raised and lowered by a power operated device such as a hydraulic actuator, in which case a hydraulic pump for providing pressurized hydraulic fluid may be provided on the sub-frame. A valve block for controlling the hydraulic actuator may also be mounted by the sub-frame.

The sub-frame may also mount a cooling pack for providing coolant at least for cooling the engine.

Particularly where the sub-frame is provided at or towards a rear end of the machine, the axle carried by the sub-frame may thus be a rear axle of the machine, in which case a front axle of the machine may be mounted beneath the second part of the single primary chassis member. The front axle may carry a front pair of ground engaging wheels, which may too be driven by the transmission. All four, or only the front or the rear wheels may be steerable, or further alternatively, the machine may be so called skid-steered, in which steering of the machine is effected by braking the front and rear wheel at one side of the machine whilst driving at least one of the front and rear wheels at the other side of the machine.

The cab structure may be mounted between the second part of the single primary chassis member and the sub-frame, preferably with damping at least partially to isolate a machine operator in the cab structure, from engine vibrations, and partially to provide some suspension, at least partially to isolate an operator in the cab structure from vibrations arising as the machine travels over the ground.

It will be appreciated that a working machine in accordance with the present invention will tend to be overall, small and in conventional such machines there is restricted working space in which to assemble and maintain the engine, cooling pack, hydraulic pump and other operational components. However the sub-frame in the construction described, may be secured to the single primary chassis member subsequent to each of the components being assembled to it. Preferably therefore the sub-frame is secured to the single primary chassis member by fasteners.

According to a second aspect of the invention we provide a method of assembling a working machine which includes a working arm, the arm in use, carrying a working implement, the arm being raisable and lowerable about a generally horizontal axis by a power operated device, a cab structure for an operator, an engine for providing power to a ground engaging drive structure to drive the machine over the ground and for operating the working arm, the cab structure and the engine being mounted on a machine chassis, characterised in that the chassis includes a single primary chassis member which provides a substantial resistance to torsional deformation of the machine between the front and rear ends of the machine, the single primary chassis member including a first part which extends longitudinally of the machine at the one side of the machine, and a second part which extends transversely of the first part at or towards an end of the machine and the method includes mounting the engine on a sub-frame whilst the sub-frame is separate from the chassis, and subsequently securing the sub-frame to the single primary chassis member and hence mounting the engine on the chassis.

BRIEF DESCRIPTION OF THE DRAWINGS

Embodiments of the invention will now be described with the aid of the accompanying drawings in which.

DETAILED DESCRIPTION OF THE INVENTION

Figure 1:
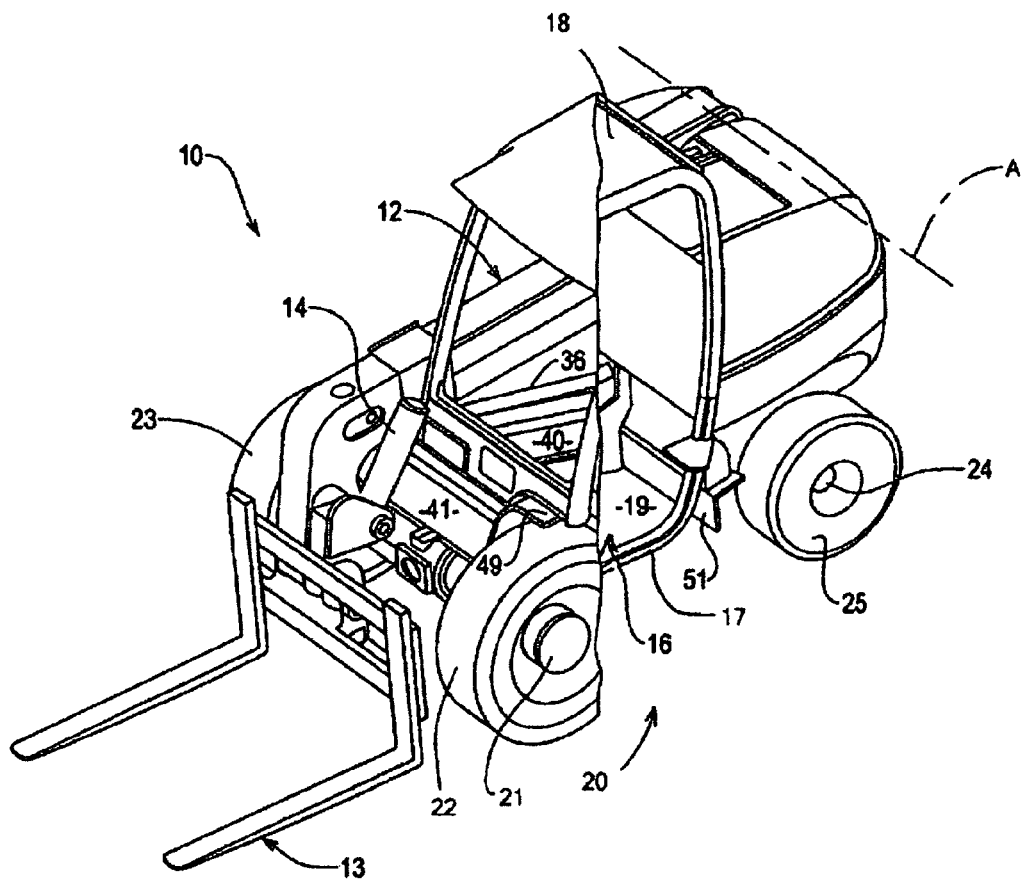
FIG. 1 is a side perspective view of a machine in accordance with the first aspect of the invention with some internal cab structure components omitted for clarity.

Referring to the drawings there is shown a working machine 10 which in this example is a loading machine, which has a working arm 12 which is mounted for raising and lowering about a generally horizontal axis A, by a power operated device which in this example is a hydraulic actuator, the working arm 12 carrying a working implement which in this example is a loading forks 13, which itself may be moved to effect loading and unloading, by a power operated, in this case hydraulic, actuator 14.

The loading machine 10 is controlled by an operator from within a cab structure 16 which includes a cab structure frame 17, roof panels 18, and a floor, a space for which is indicated at 19.

The machine 10 has a ground engaging structure 20 provided by a front axle 21 which carries a front pair of ground engaging wheels 22, 23, and a rear axle 24 which carries a rear pair of ground engaging wheels 25. In this example, all four wheels, shown as 22, 23 and 25, are drivable wheels as hereinafter described, but in another embodiment only the front 22, 23 or the rear wheels 25 may be driven, to drive the machine 10 over the ground.

The machine 10 also includes an engine 30 to provide power to drive the machine 10, and to drive a main hydraulic pump 31 which, where the machine is hydrostatically driven, provides a supply of pressurized hydraulic fluid for a drive motor 56 of a hydraulic transmission, and the engine 30 may also power a service pump 32 for providing hydraulic fluid under pressure for use by the hydraulic actuators 14 described.

Figure 2:
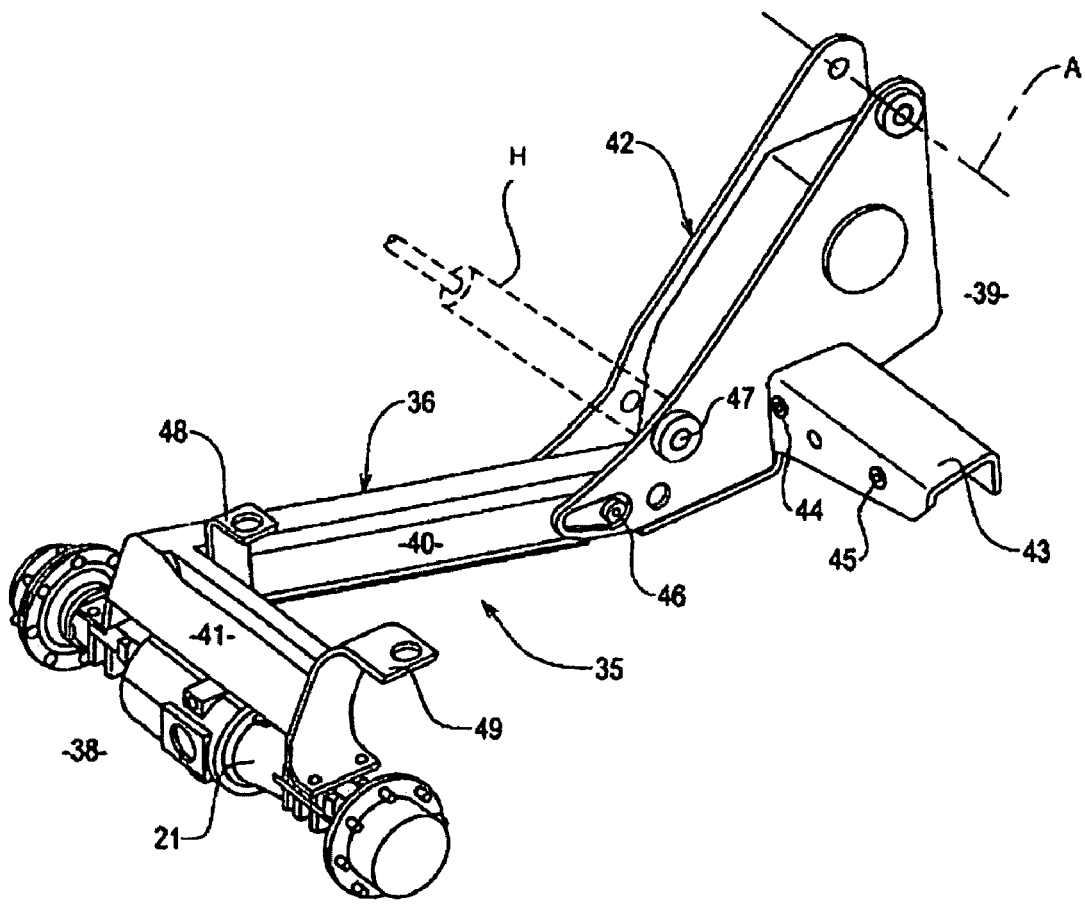
FIG. 2 is a side perspective view of a chassis of the machine of FIG. 1, and showing a front axle.

Referring particularly to FIG. 2, the working arm 12, the cab structure 16, the ground engaging structure 20, and the engine 30 are all mounted on a machine chassis 35 which includes a single main single primary chassis member 36 which provides a substantial resistance to torsional deformation of the machine 10 between front 38 and rear 39 ends of the machine 10, the single primary chassis member 36 including a first part 40 which extends generally longitudinally of the machine 10 at one side of the machine 10, and a second part 41 which extends transversely of the first part 40 in this case at or towards the front end 38 of the machine 10.

The first part 40 of the single primary chassis member 36 may be provided by a box section fabrication including a channel shaped element in which the mouth of the channel is closed by a closure plate, or any other desired configuration which is able to provide the necessary stiffness. The second part 41 of the single primary chassis member 36 may similarly be provided by a box section or other fabrication, but may also be of another suitable configuration. The first 40 and second 41 parts of the single primary chassis member 36 may be integrally provided, or secured together to provide an integral single primary chassis member 36 construction.

The chassis 35 further includes a mounting structure 42 for mounting the working arm 12, the mounting structure 42 being a fabrication which is welded or otherwise permanently and rigidly fixed to the first part 40 of the single primary chassis member 36. From the mounting structure 42, and extending to the side of the first part 40, is a third chassis part 43 which extends transversely from the mounting structure 42.

In FIG. 2, it can be seen that the front axle 21 is secured beneath the second part 41 of the single primary chassis member 36. It can also be seen that the third part 43 includes a pair of mounting openings 44, 45, and that the first part 40 further includes a mounting opening 46, the mounting openings 44, 45, 46 each in use receiving a fastener for a purposes hereinafter explained. An opening 47 in the mounting structure 42 provides for mounting the hydraulic lifting actuator for raising and lowering the working arm 12, the position of the actuator being indicated at H.

The second part 41 of the single primary chassis member 36 carries mountings 48, 49 for mounting the cab structure 16 with damping e.g. using elastic spacers to provide for some damped suspension of the cab structure 16 relative to the remainder of the machine 10, for operator comfort.

Figure 3:
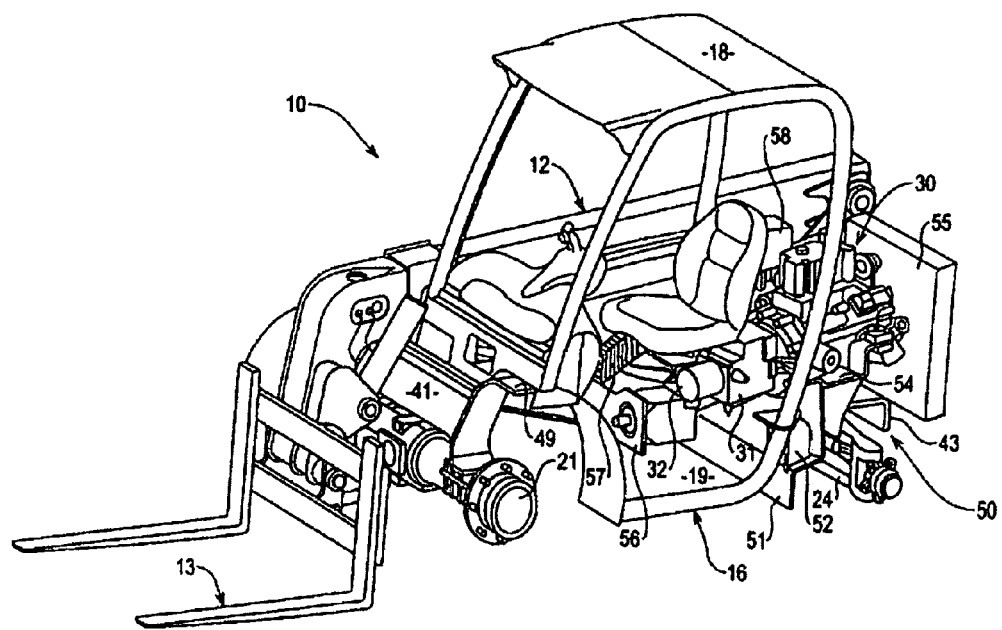
FIG. 3 is an illustrative perspective view of the, machine of FIG. 1 with internal cab structure components omitted from FIG. 1 shown, but with machine panels removed to reveal internal detail.

Referring now to FIG. 3, it can be seen that the engine 30 and hydraulic pumps 31, 32 are each mounted on a sub-frame 50 which includes a fabrication which is secured via fasteners to the mounting openings 44, 45, 46 provided by the third chassis part 43 and the first part 40 of the single primary chassis member 36. The sub-frame includes an L-shaped element 51 which carries further mountings 52 for the cab structure 16, the further mountings 52, similarly to the mountings 48, 49 provided by the second part 41 of the single primary chassis member 36, providing for damped suspension of the cab structure 16.

The sub-frame 50 further includes a supporting structure 54 for supporting the engine 30 above, and rear axle 24 beneath, and for supporting a cooling pack 55 at the rear end 39 of the machine 10, a hydraulically driven transmission motor 56, and for a valve block 57 by means of which the hydraulic actuators 14 for the working arm 12 lifting actuator and the working implement actuator 14 may be controlled, as may the transmission motor 56. The sub-frame 50 also includes a pillar 58 on a part of which the working arm 12 may be rested when in a lowered condition.

A mechanical connection (not shown) is provided between the transmission motor 56 and the front 21 and rear 24 axles to effect drive of the wheels 22, 23, 25 carried thereby, or to two only of the wheels where the machine 10 is two wheel only driven.

In FIG. 1, it can be seen that various body panels are provided to conceal the working parts of the components of the machine 10.

To manufacture the machine 10, the sub-frame 50 may be assembled substantially fully separately from i.e. prior to securing the sub-frame 50 to, the chassis 35, with all the various components. The sub-frame 50 may be offered up to the chassis 35 and assembled to the chassis 35 using fasteners to engage the mountings 44, 45, and 46 of the third chassis part 43 and the first part 40 of the single primary chassis member 36. The cab structure 16 may then be assembled between the chassis 35 and sub-frame 50, using the cab structure mounting formations 48, 49 provided by the second part 41 of the single primary chassis member 35 and the mounting formations 52 of the sub-frame 50.

Although the sub frame 50 and the cab structure 16 may contribute some stiffness to the machine 10, the single primary chassis member 36 provides a substantial torsional stiffness. However by virtue of there being no chassis member beneath the cab structure 16, the cab structure 16 overall may be positioned low, by the side of the first part 40 of the single primary chassis member 36, and behind the second part 41 of the single primary chassis member 36, whilst an acceptable ground clearance between the chassis 35, and the bottom of the cab structure 16, and the ground can be maintained. Of course a frame member may be positioned beneath the cab structure 16 and could even interconnect the second part 41 of the single primary chassis member 36 adjacent wheel 22, and a rear chassis part, such as the third chassis part 43, as required, but necessarily this would have to be of small dimension depthwise, and thus although this may assist in supporting the cab structure 16, such a frame member would not provide any substantial resistance to torsional deformation of the machine 10 between the front and rear ends 38, 39.

Various modifications may be made without departing from the scope of the invention.

In the embodiment described, the engine 30 is provided towards the rear end 39 of the machine 10 and is mounted on a sub-frame 50 secured in part to the first part 40 of the single primary chassis member 16 and in part to the (rear) chassis part 43. In another example, the engine 30 may be mounted towards a front end 38 of the machine 10 and could be secured in part to the second part 41 of the single primary chassis member 36. In this case the cab structure 16 may be provided further rearwardly than in the example described.

The invention may be applied to other than a loading machine 10 as described, for example only to a machine able to provide loading and excavating functions, or an excavating function only. Thus the working arm 12 need not be a loader arm 12 mounted at a side of the machine 10 to extend longitudinally over the first part 40 of the single primary chassis member 36 as shown and described, but the working arm 12 may be provided at a rear end 39 of the machine 10, or may be provided by one or a pair of arm elements which are mounted to the chassis 35 in front of the cab structure 16, for example on a mounting structure provided on the second part 41 of the single primary chassis member 36.

Having now fully described the present invention in some detail by way of illustration and examples for purposes of clarity of understanding, it will be obvious to one of ordinary skill in the art that the same can be performed by modifying or changing the invention within a wide and equivalent range of conditions, dimensions and other parameters without affecting the scope of the invention or any specific embodiment thereof, and that such modifications or changes are intended to be encompassed within the scope of the appended claims. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

All references cited herein are hereby incorporated by reference in their entirety to the extent that there is no inconsistency with the disclosure of this specification. All headings used herein are for convenience only.

The invention claimed is:

1. A working machine which includes a working arm for carrying a working implement, the arm being raisable and lowerable about a generally horizontal axis by a power operated device, a cab structure for an operator, an engine for providing power to a ground engaging drive structure to drive the machine over the ground and for operating the working arm, each of the working arm, the cab structure and the engine being mounted on a machine chassis, wherein the chassis includes a single primary chassis member which provides a substantial resistance to torsional deformation of the machine between the front and rear ends of the machine, the single primary chassis member including a first part which extends longitudinally of the machine at one side of the machine, and a second part which extends transversely of the first part at or towards a front end of the machine, and wherein the cab structure is positioned beside the first part of the single primary chassis member and behind the second part of the single primary chassis member, and the engine is mounted on a sub-frame which is secured to a third part of the single primary chassis member which is located at or towards a rear end of the machine, and which extends transversely of the first part of the single primary chassis member, the sub-frame carrying a rear axle of the machine, and a front axle of the machine being mounted beneath the second part of the single primary chassis member.

2. A machine according to claim 1 wherein the working arm is a loader arm carrying the working implement.

3. A machine according to claim 2 wherein the loader arm is mounted on the chassis so as to extend forwardly of the machine generally above the first part of the single primary chassis member.

4. A machine according to claim 3 wherein a mounting structure for the loader arm is positioned at or towards a rear end of the first part of the single primary chassis member.

5. A machine according to claim 1 wherein the sub-frame is secured to the single primary chassis member by fasteners.

6. A machine according to claim 1 wherein the sub-frame extends beside the first part of the single primary chassis member.

7. A machine according to claim 1 wherein the sub-frame carries an axle beneath.

8. A machine according to claim 7 wherein drive is transmitted to the axle beneath the sub-frame via a transmission, from the engine, the axle carrying a pair of drivable ground engaging wheels.

9. A machine according to claim 8 wherein the transmission is hydrostatic, there being at least one hydraulically driven transmission motor to drive the wheels, mounted on the sub-frame.

10. A machine according to claim 1 wherein the working arm is raiseable and lowerable by a hydraulic power operated device, a hydraulic pump for providing pressurised hydraulic fluid being provided on the sub-frame.

11. A machine according to claim 1 wherein a valve block for controlling a hydraulic actuator is mounted by the sub-frame.

12. A machine according to claim 1 wherein the sub-frame mounts a cooling pack for providing coolant at least for cooling the engine.

13. A machine according to claim 1 wherein the front axle carries a front pair of ground engaging wheels.

14. A machine according to claim 13 wherein the front wheels are driven by a transmission.

15. A machine according to claim 13 wherein at least the front wheels or a rear pair of ground engaging wheels are steerable.

16. A machine according to claim 15 in which steering of the machine is effected by braking the front and rear wheels at one side of the machine whilst driving at least one of the front and rear wheels at the other side of the machine.

17. A machine according to claim 1 wherein mountings mounting the cab structure provide damping at least partially to isolate a machine operator in the cab structure, from vibrations.

18. A method of assembling a working machine including a working arm carrying a working implement, the arm being raisable and lowerable about a generally horizontal axis by a power operated device, a cab structure for an operator, an engine providing power to a ground engaging drive structure to drive the machine over the ground and for operating the working arm, the cab structure and the engine being mounted on a machine chassis, and wherein the chassis includes a single primary chassis member which provides a substantial resistance to torsional deformation of the machine between the front and rear ends of the machine, the single primary chassis member including a first part which extends longitudinally of the machine at the one side of the machine, and a second part which extends transversely of the first part at or towards an end of the machine, providing the cab structure positioned beside the first part of the single primary chassis member and behind the second part of the single primary chassis member, and mounting the engine on a sub-frame which is secured to a third part of the single primary chassis member which is located at or towards a rear end of the machine and which extends transversely of the first part of the single primary chassis member, the sub-frame carrying a rear axle of the machine, with a front axle being mounted beneath the second part of the single primary chassis member, and wherein the method includes mounting the engine on the sub-frame whilst the sub-frame is separate from the chassis, and subsequently securing the sub-frame to the single primary chassis member and hence mounting the engine on the chassis.

* * * * *